Oct. 15, 1935.  M. G. NORMAN  2,017,767
DRAIN TRAP
Filed March 28, 1934   2 Sheets-Sheet 1
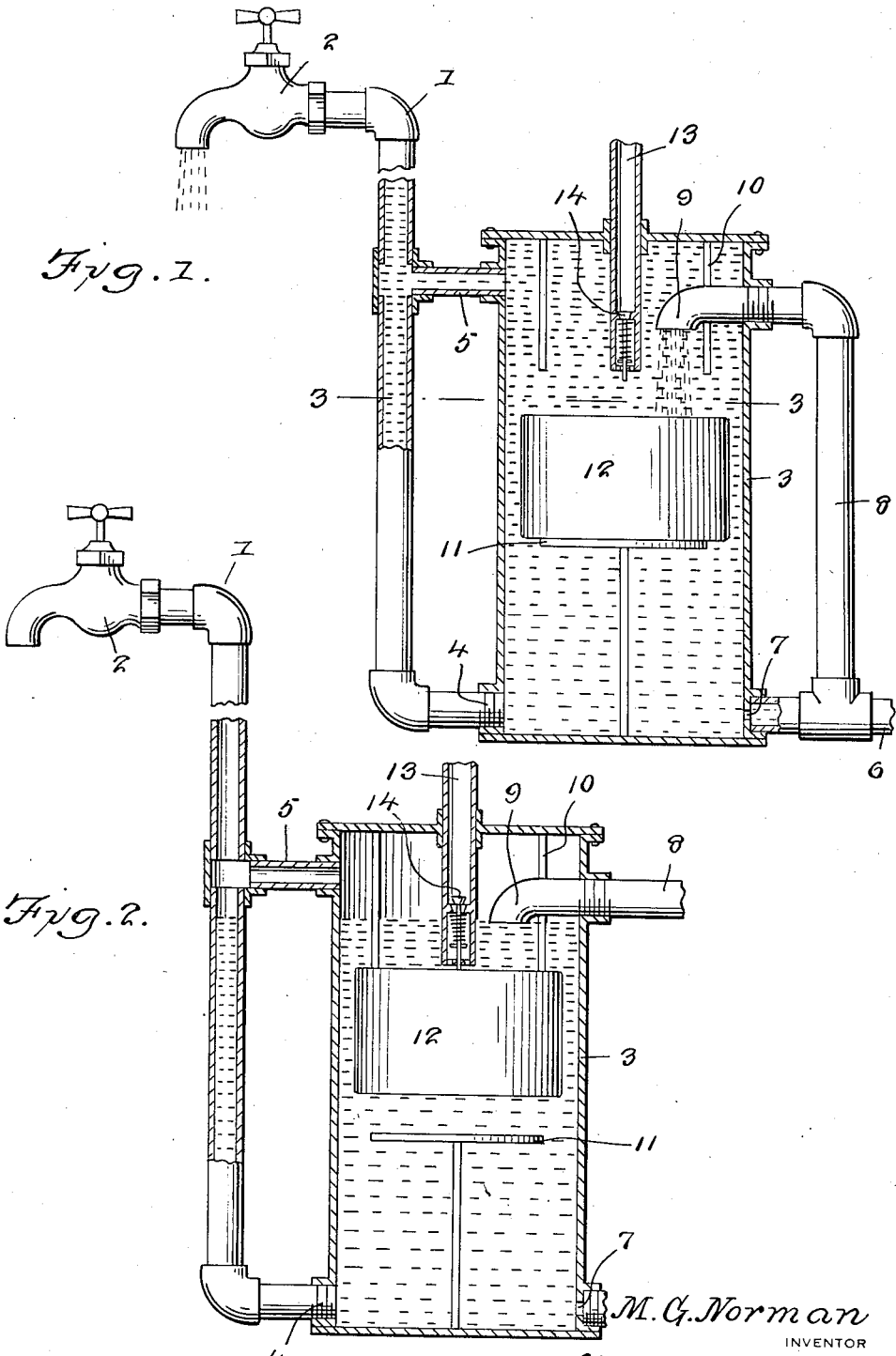

Oct. 15, 1935.    M. G. NORMAN    2,017,767
DRAIN TRAP
Filed March 28, 1934    2 Sheets-Sheet 2

M. G. Norman
INVENTOR
BY Victor J. Evans & Co.
ATTORNEY

Patented Oct. 15, 1935

2,017,767

UNITED STATES PATENT OFFICE 2,017,767

DRAIN TRAP

Mathew G. Norman, Wewoka, Okla.

Application March 28, 1934, Serial No. 717,825

2 Claims. (Cl. 137—13)

This invention relates to drain traps and has for the primary object the provision of a device of the above stated character which is especially adapted for hydrants to prevent freezing of the latter in cold weather and which is automatic in operation and which will permit water being obtained from the hydrant at any time desired and in the usual way by simply opening the control valve thereof.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a drain trap constructed in accordance with my invention and showing the same applied to a hydrant.

Figure 2 is a similar view showing the hydrant freed of water when the control valve thereof is in closed position.

Figure 3:
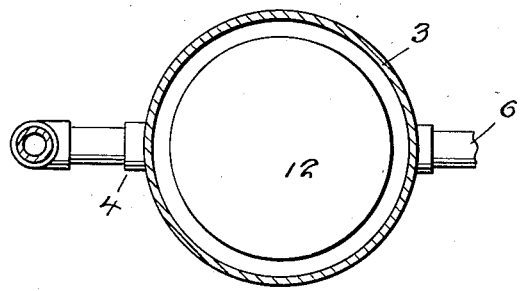
Figure 3 is a view taken on the line 3—3 of Figure 1.
Figure 4:
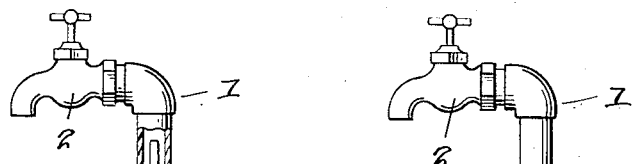
Figure 4 is a vertical sectional view illustrating a modified form of my invention.

Referring in detail to the drawings, the numeral 1 indicates a hydrant of a conventional type wherein the control valve 2 thereof is located above the surface of the ground so that in cold weather the water or like fluid will be subject to freezing. To free the hydrant of water and consequently prevent freezing thereof my invention is employed and consists of a tank 3 adapted to be sunk in the ground at a suitable distance under the surface of the ground for the purpose of preventing the contents of the tank freezing. The intake end of the hydrant 1 is connected to the bottom of the tank, as shown at 4, and the upper end of said tank is connected to the hydrant by a bypass pipe 5. The character 6 indicates a water supply pipe connected to the tank adjacent the bottom thereof by a restricted passage or port 7. Connected to the supply pipe 6 is an inlet pipe 8 which extends into the tank 3 adjacent the upper end of the latter and terminates in a downwardly directed spout 9. Upper and lower float stops 10 and 11 are arranged in the tank 1 and operating between the upper and lower stops is a float 12 positioned directly under the spout 9 so that the incoming fluid or water from the supply pipe 6 will be directed onto the float and cause the latter to sink against the stop 11. It is to be understood that the tank becomes filled with water as well as the hydrant and may be dispensed therefrom by opening the control valve 2 of the hydrant. An air supply pipe 13 extends into the tank at the upper end of the latter and has located therein a self-seating valve 14, the stem of which projects below the lower end of the air pipe to be engaged by the float 12 when the latter rises. The air supply pipe 13 is connected to an air supply (not shown) the pressure of which exceeds the pressure of the water in the supply pipe 6. As long as the control valve 2 is open and water discharging therefrom, water enters the tank by way of the nozzle 9 and the force of this water retains the float 12 against the stop 11, permitting the valve 14 to remain closed. As soon as the control valve 2 is closed, the flow of water from the nozzle 9 discontinues and the float rises and unseats the valve 14 admitting the air pressure to the tank. The air pressure acts upon the water within the tank 1 and causes the same to back up into the supply pipe 6. The air pressure also acts in the hydrant by way of the bypass pipe 5 to return the water from the hydrant to the tank, thereby emptying the hydrant of water so that the part of the hydrant disposed above the surface of the ground and subject to cold temperatures will not freeze and burst. After the admittance of air pressure to the tank 3 and the parts assume the position as shown in Figure 2, the opening of the control valve 2 will permit the air to escape and the water to enter the nozzle 9 which strikes the float 12 and forces the latter downwardly to permit seating of the valve 14 to cut off the air pressure and the flow of water from the control valve 2 will then be had.

Referring to my modified form of invention, the upper portion of the tank 3 is connected to the hydrant 1 by a pipe 16 which enters the hydrant in a plane slightly below the upper end of the tank and then extends upwardly in the hydrant and terminates adjacent the control valve 2 so that the air pressure will be delivered into the hydrant at a point adjacent the control valve and thereby readily displace the water within the hydrant to the tank 3 when the control valve is in a closed position.

Figure 5:
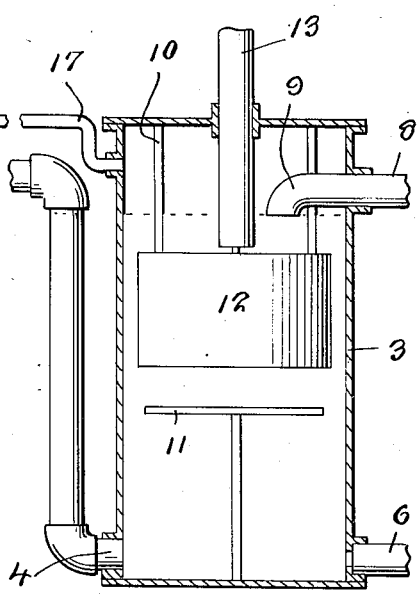
Figure 5 is a similar view showing another modified form of my invention.

Referring to my modified form of invention as shown in Figure 5, the hydrant is shown as being constructed of a series of angularly related sections and connected to the tank 3 in the usual manner adjacent the lower end of the latter. A bypass pipe 17 is connected to the upper portion of the tank 3 and to the hydrant in a plane substantially in alignment with the upper end of the tank 3 and consists of angularly related portions.

Having described the invention, I claim:

1. In combination with a hydrant having a control valve, and a water supply pipe, a tank adapted to be submerged in the ground and having a restricted port adjacent its lower end and connected to the water supply pipe, said hydrant connected to said tank adjacent the lower end of the latter, a bypass pipe between the hydrant and the tank and located adjacent the upper end of the latter, a water discharge pipe connected to the water supply pipe and terminating in the tank adjacent the upper end of the latter, and a float controlled pressure supply means connected to the tank to displace water from the hydrant when the control valve occupies a closed position and automatically closed during the opening of the control valve by the water entering the tank from said water supply pipe.

2. In combination with a hydrant having a control valve and a water supply pipe, a tank adapted to be submerged in the ground and having a restricted port adjacent its lower end and connected to the water supply pipe, said hydrant connected to said tank adjacent the lower end of the latter, a bypass pipe between the hydrant and the tank and located adjacent the upper end of the latter, a water discharge pipe connected to the water supply pipe and terminating in the tank adjacent the upper end of the latter, upper and lower float stops arranged in the tank, a float operating between said stops and moved downwardly in said tank by the force of the water from the water supply pipe during the opening of the control valve, an air pressure pipe entering the upper end of the tank, a self-closing valve for said air pressure pipe and engaged by the float during the closing of the control valve to admit air pressure to the tank and hydrant for displacing the water from the hydrant.

MATHEW G. NORMAN.